(12) United States Patent  
Derom et al.

(10) Patent No.: US 8,320,252 B2  
(45) Date of Patent: Nov. 27, 2012

(54) SYSTEM AND METHOD FOR DATA COMMUNICATIONS USING A SLIDING WINDOW PROTOCOL WITH SELECTIVE RETRANSMISSION

(75) Inventors: Koen Derom, Kessel-Lo (BE); Ludo Lenaerts, Hasselt (BE)

(73) Assignee: NXP B.V., Eindhoven (NL)

( * ) Notice: Subject to any disclaimer, the term of this patent is extended or adjusted under 35 U.S.C. 154(b) by 325 days.

(21) Appl. No.: 12/611,281

(22) Filed: Nov. 3, 2009

(65) Prior Publication Data

US 2011/0103403 A1    May 5, 2011

(51) Int. Cl.
  *H04L 1/00* (2006.01)
(52) U.S. Cl. ...................................... 370/235
(58) Field of Classification Search .......... 370/229, 370/230, 231, 235, 241, 252, 276, 277, 278, 370/282, 464, 465, 473, 474
  See application file for complete search history.

(56) References Cited

U.S. PATENT DOCUMENTS

| 5,912,903 | A * | 6/1999 | Nakayashiki et al. ......... 714/749 |
| 6,118,765 | A * | 9/2000 | Phillips ......................... 370/235 |
| 6,292,470 | B1 | 9/2001 | Uota |
| 6,587,985 | B1 | 7/2003 | Fukushima et al. |
| 2003/0081664 | A1 * | 5/2003 | Lu et al. ........................ 375/222 |
| 2005/0036511 | A1 * | 2/2005 | Baratakke et al. ............ 370/469 |
| 2005/0100048 | A1 | 5/2005 | Chun et al. |
| 2005/0286447 | A1 * | 12/2005 | Coffman ....................... 370/278 |
| 2006/0013257 | A1 * | 1/2006 | Vayanos ....................... 370/473 |
| 2007/0159985 | A1 * | 7/2007 | Sunell et al. .................. 370/254 |
| 2008/0172482 | A1 * | 7/2008 | Shah .............................. 709/223 |

FOREIGN PATENT DOCUMENTS

EP     1511214 A2    3/2005

OTHER PUBLICATIONS

"Sliding Window Protocol," from Wikipedia, 6 pgs., dated Feb. 5, 2011.
Extended European Search Report for European Patent Appln. 10191593.2 (Jun. 17, 2011).
'Computer Networks' by Andrew S. Tanenbaum, third edition, section 3.4.3, "A Protocol using selective repeat".
"Wireless Universal Serial Bus Specification", Revision 1.0, section 5.4 "Data burst synchronization and retry"; May 12, 2005.
ECMA-368 2nd Edition; "High Rate Ultra Wideband PHY and MAC Standard"; section 17.8.3, 'Block ACK'; Dec. 2007.

\* cited by examiner

Primary Examiner — Obaidul Huq

(57) ABSTRACT

A system and method for data communications involves receiving a data frame in a receiver using a sliding receive window protocol, where a sliding receive window of the sliding receive window protocol is identified by sliding receive window information, and determining whether the data frame is a retransmitted data frame using the sliding receive window information.

14 Claims, 20 Drawing Sheets

SYSTEM AND METHOD FOR DATA COMMUNICATIONS USING A SLIDING WINDOW PROTOCOL WITH SELECTIVE RETRANSMISSION

Embodiments of the invention relate generally to data communications systems and methods and, more particularly, to a system and method for data communications using a sliding window protocol with selective retransmission.

Sliding window protocols can be used in communications devices to allow simultaneous transmission of multiple data frames between the communications devices. In sliding window protocols, a previously transmitted data frame that is lost or corrupted during transmission may be transmitted again, i.e., "retransmitted." However, sliding windows in traditional communications devices lack information about retransmitted frames, which can lead to throughput inefficiencies.

A system and method for data communications involves receiving a data frame in a receiver using a sliding receive window protocol, where a sliding receive window of the sliding receive window protocol is identified by sliding receive window information, and determining whether the data frame is a retransmitted data frame using the sliding receive window information. By using the sliding receive window information to determine whether a received data frame is a retransmitted data frame, the system and method for data communications can improve the efficiency of a sliding receive window protocol.

A method for data communications involves receiving a data frame in a receiver using a sliding receive window protocol, where a sliding receive window of the sliding receive window protocol is identified by sliding receive window information, and determining whether the data frame is a retransmitted data frame using the sliding receive window information.

A method for data communications involves transmitting a set of data frames from a transmitter using a sliding transmit window protocol, where a sliding transmit window of the sliding transmit window protocol is identified by sliding transmit window information about data frames that are currently allowed to be transmitted from the transmitter without waiting for an acknowledgement signal, where the number of data frames in the set is smaller than the number of the data frames in the sliding transmit window, and determining whether or not to retransmit one of the data frames in the set before all of the data frames in the sliding transmit window have been transmitted by the transmitter.

A communications device includes a receiver and a frame retransmission identifying unit. The receiver is configured to receive a data frame using a sliding receive window protocol, where a sliding receive window of the sliding receive window protocol is identified by sliding receive window information. The frame retransmission identifying unit is configured to determine whether the data frame is a retransmitted data frame using the sliding receive window information.

Other aspects and advantages of embodiments of the present invention will become apparent from the following detailed description, taken in conjunction with the accompanying drawings, depicted by way of example of the principles of the invention.

Figure 9:
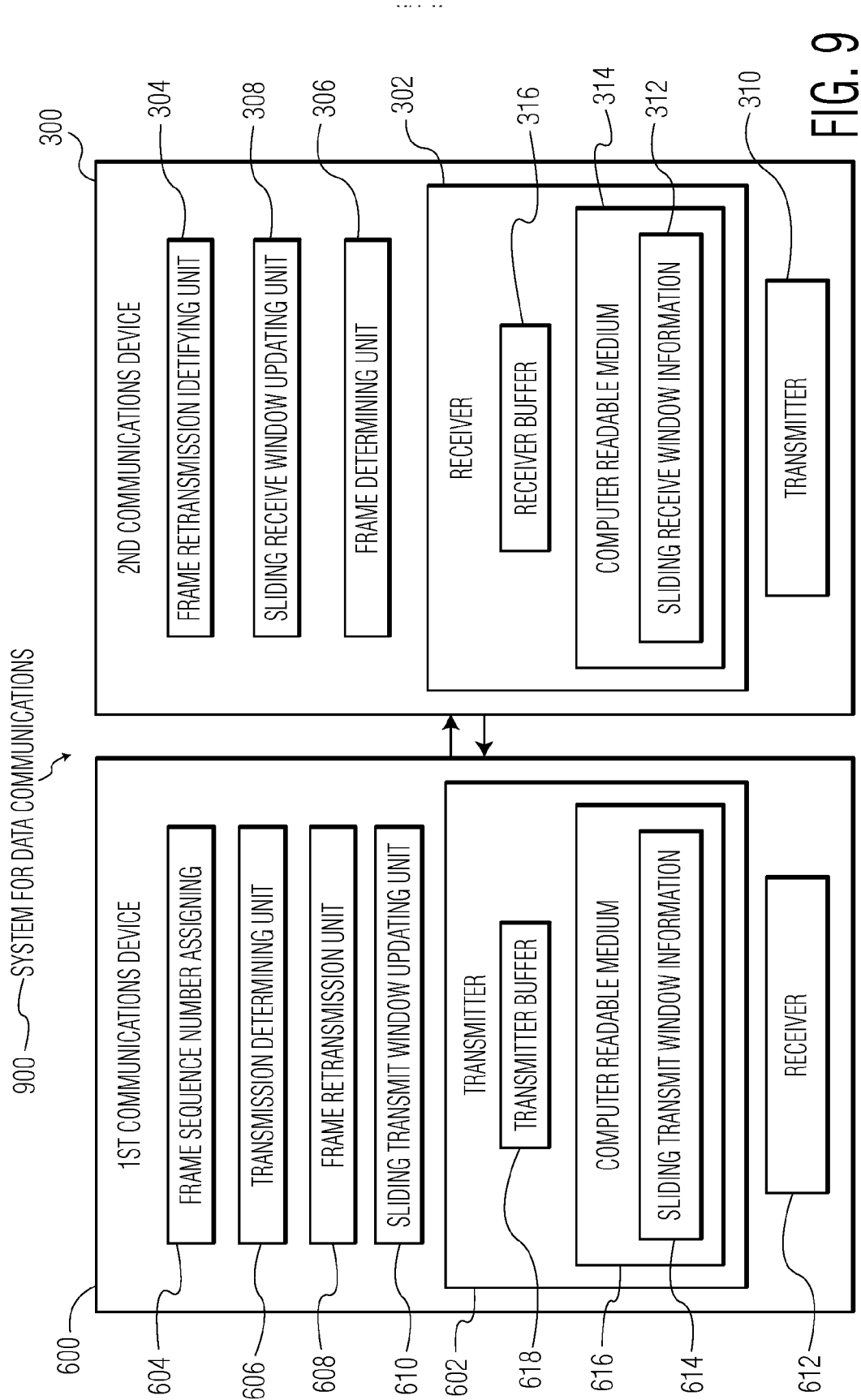
FIG. 9 is a schematic block diagram of a system for data communications in accordance with another embodiment of the invention.

FIGS. 14A, 14B, 14C, and 14D illustrate exemplary operations of the first communications device of FIG. 9.

Figure 15A:
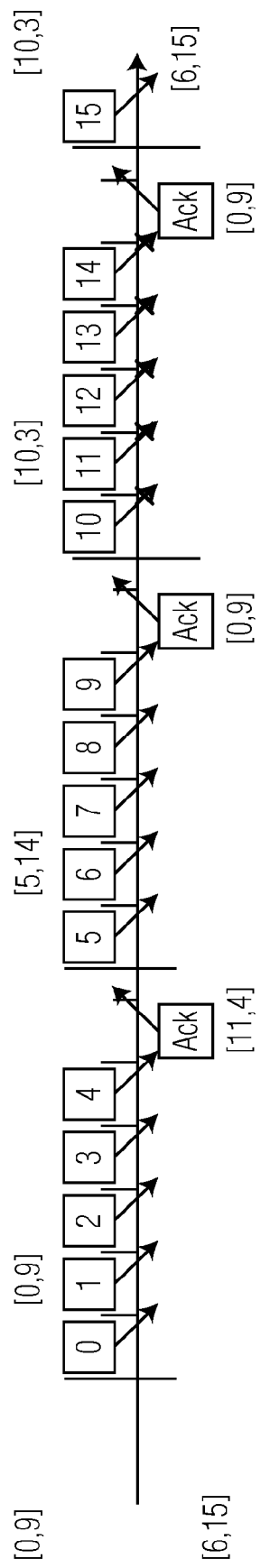
Figure 15B:
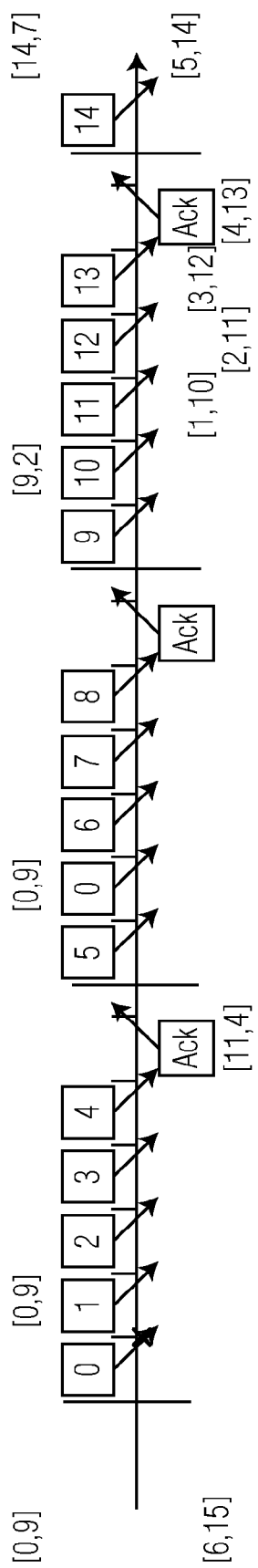

FIGS. 15A and 15B illustrate exemplary sliding window updating operations of the system of FIG. 9.

Figure 16:
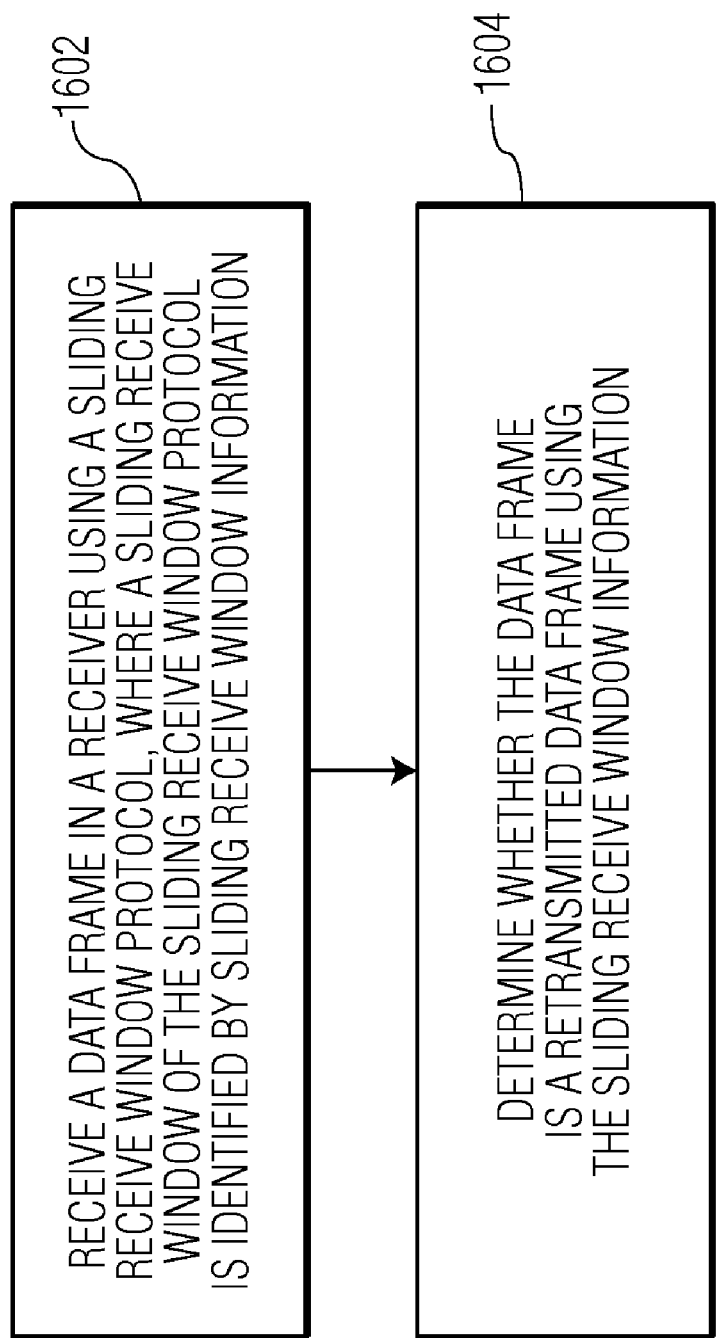

FIG. 16 is a process flow diagram of a method for data communications in accordance with an embodiment of the invention.

Throughout the description, similar reference numbers may be used to identify similar elements.

Figure 1:
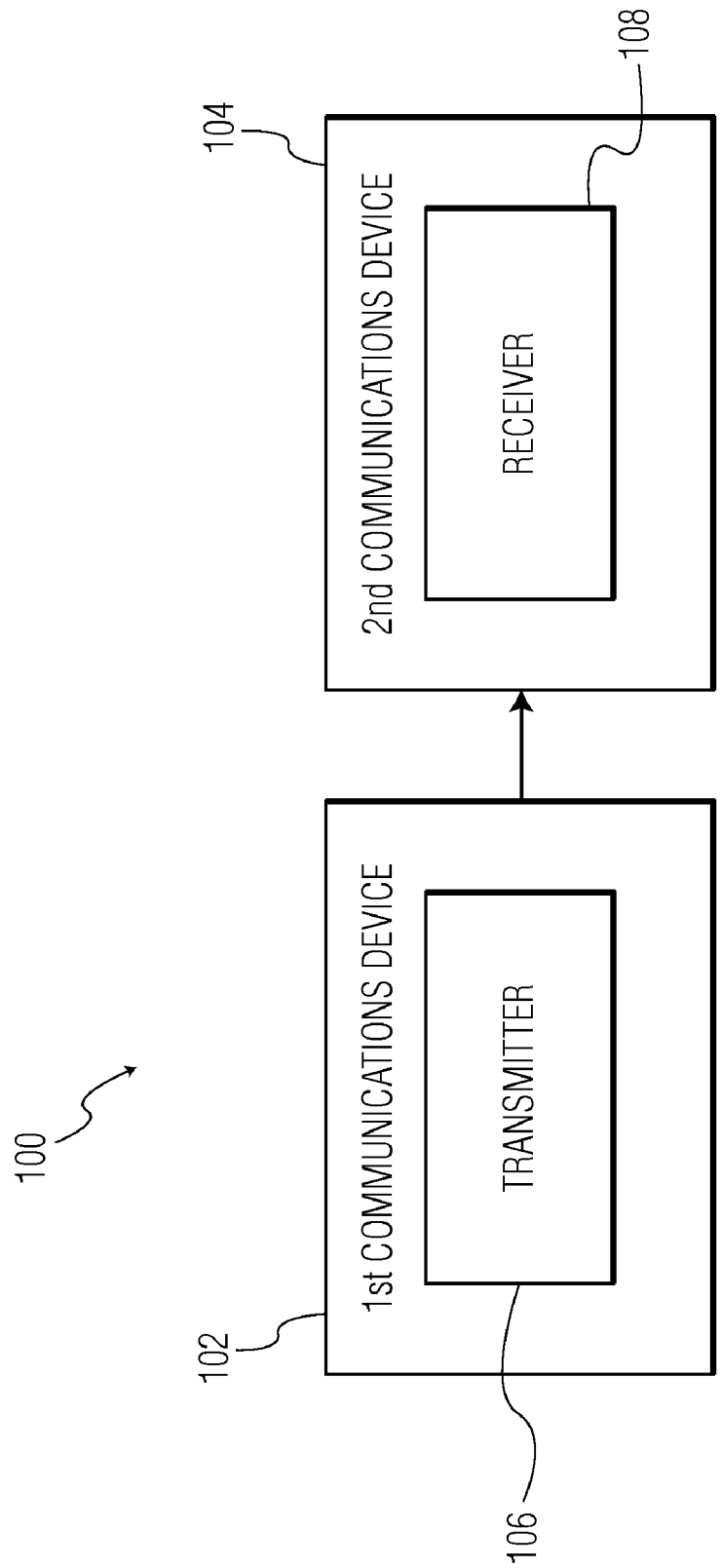
FIG. 1 is a schematic block diagram of a system for data communications in accordance with an embodiment of the invention.

FIG. 1 is a schematic block diagram of a system 100 for data communications in accordance with an embodiment of the invention. As shown in FIG. 1, the system includes a first communications device 102 and a second communications device 104. The system may be a wireless communications system or a wired communications system.

In the embodiment of FIG. 1, the first communications device 102 includes a transmitter 106. The transmitter is configured to transmit at least one data frame to the second communications device using a sliding transmit window protocol, where a sliding transmit window of the sliding transmit window protocol is identified by sliding transmit window information. The sliding transmit window information contains information about data frames that are currently allowed to be transmitted using the transmitter without waiting for an acknowledgement signal. In an embodiment, the sliding transmit window information identifies the frame sequence number of each data frame that is currently allowed to be transmitted. For example, the sliding transmit window information identifies that data frames "0"-"4" of a series of data frames "0"-"15" are currently allowed to be transmitted. The sliding transmit window information may be stored in a computer readable medium (not shown) in the transmitter. In an embodiment, the transmitter transmits a burst of data frames in different forward frequency channels. Compared to transmitting the data frames in a single frequency channel, transmitting the data frames in multiple different frequency channels can improve transmission throughput. In another embodiment, the transmitter transmits at least one data frame using a TDMA scheme.

The second communications device 104 includes a receiver 108. The receiver is configured to receive the data frame from the first communications device 102 using a sliding receive window protocol, where a sliding receive window of the sliding receive window protocol is identified by sliding receive window information. The sliding receive window information contains information that indicates whether a received data frames is a data frame that has been retransmitted from the first communications device. The sliding receive window information also contains information about data frames in the sliding receive window that the receiver is currently accepting from the first communications device. In an embodiment, the information about the data frames in the sliding receive window includes frame sequence numbers of the data frames in the sliding receive window. For example, the sliding receive window information identifies that the receiver is currently accepting data frames "5"-"8" of a series of data frames "0"-"15." The sliding receive window information may be stored in a computer readable medium (not shown) in the receiver. In an embodiment, the number of data frames in the sliding receive window is greater than half of the total available frame sequence numbers. Although the first communications device includes the transmitter 106 and the second communications device includes the receiver in FIG. 1, each of the first and second communications devices may include both a transmitter and a receiver in other embodiments.

In an embodiment, the transmitter 106 in the first communications device 102 transmits a single data frame in a forward frequency channel and the receiver 108 in the second communications device 104 replies with a response data frame to acknowledge the data frame in a reverse frequency channel that is different from the forward frequency channel. In another embodiment, the transmitter in the first communications device transmits a burst of data frames to the receiver in the second communications device in different forward frequency channels and the receiver in the second communications device replies with at least one response data frame to acknowledge the burst of data frames in a reverse frequency channel, where each of the different forward frequency channels is different from the reverse frequency channel. In some embodiments, the response data frame does not carry any payload data. For example, the response data frame only carries one or more acknowledgement signals, for example, acknowledgement bits, for one or more data frames that are successfully received.

In an embodiment, for a particular frame sequence number, the sliding transmit window information contains information that indicates whether or not a data frame carrying the particular frame sequence number has been transmitted and/or whether or not an acknowledgement for the data frame carrying the particular frame sequence number has been received. In an embodiment, for a particular frame sequence number, the sliding receive window information contains information that indicates whether or not a data frame carrying the frame sequence number has been received and/or whether or not the data frame carrying the frame sequence number is a retransmitted data frame.

Figure 2:
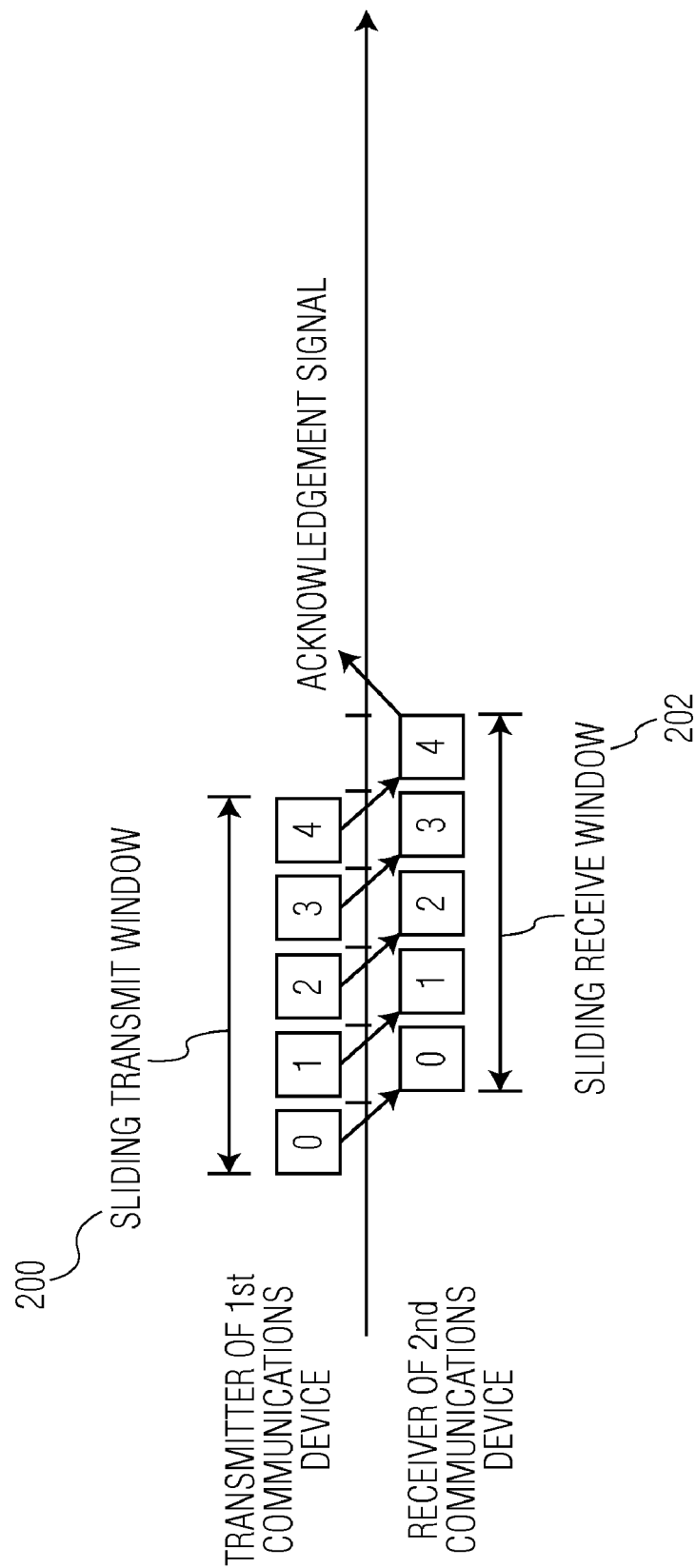
FIG. 2 depicts an exemplary sliding transmit window and an exemplary sliding receive window.

FIG. 2 depicts an exemplary sliding transmit window 200 and an exemplary sliding receive window 202. The sliding transmit window of FIG. 2 is identified by sliding transmit window information that includes information about five data frames that are currently allowed to be transmitted without waiting for an acknowledgement signal. The frame sequence numbers of the five data frames in the sliding transmit window are "0," "1," "2," "3," and "4." The number of data frames in the sliding transmit window is also referred to as the size of the sliding transmit window. The sliding receive window of FIG. 2 is identified by sliding receive window information that includes information about five data frames that are currently being accepted by a receiver. The number of data frames in the sliding receive window is also referred to as the size of the sliding receive window. The frame sequence numbers of the five data frames in the sliding receive window are "0," "1," "2," "3," and "4," which are the same frame sequence numbers as the frame sequence numbers of the five data frames in the sliding transmit window. However, the sliding transmit window and the sliding receive window may have different sizes in other embodiments.

In an embodiment, the sliding transmit window 200 of FIG. 2 is used by the transmitter 106 of the first communications device 102 and the sliding receive window 202 of FIG. 2 is used by the receiver 108 of the second communications device 104. An acknowledgement signal may be transmitted from a transmitter (not shown) of the second communications device to a receiver (not shown) of the first communications device to acknowledge the five received data frames.

Figure 3:
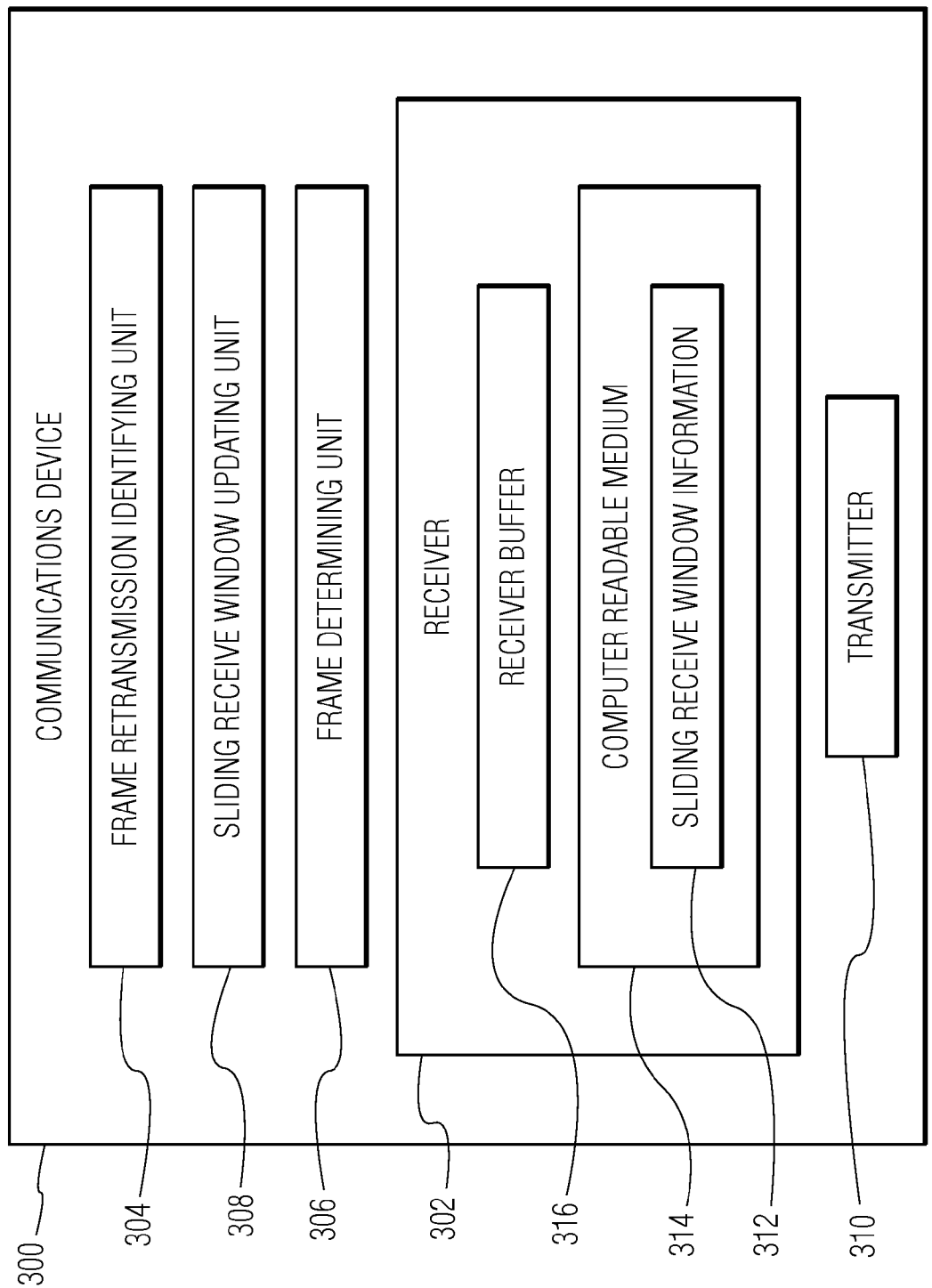
FIG. 3 is a schematic block diagram of a communications device in accordance with an embodiment of the invention.

FIG. 3 is a schematic block diagram of a communications device 300 in accordance with an embodiment of the invention. As shown in FIG. 3, the communications device includes a receiver 302, a frame retransmission identifying unit 304, a frame determining unit 306, a sliding receive window updating unit 308, and a transmitter 310. The communications device receives data frames using a sliding receive window protocol, where a sliding receive window of the sliding receive window protocol is identified by sliding receive window information 312. Although the receiver is shown as being separate from the frame determining unit, the sliding receive window updating unit, and the frame retransmission identifying unit in FIG. 3, the receiver may be integrated with the frame determining unit, the sliding receive window updating unit, or the frame retransmission identifying unit in other embodiments.

Figure 4:
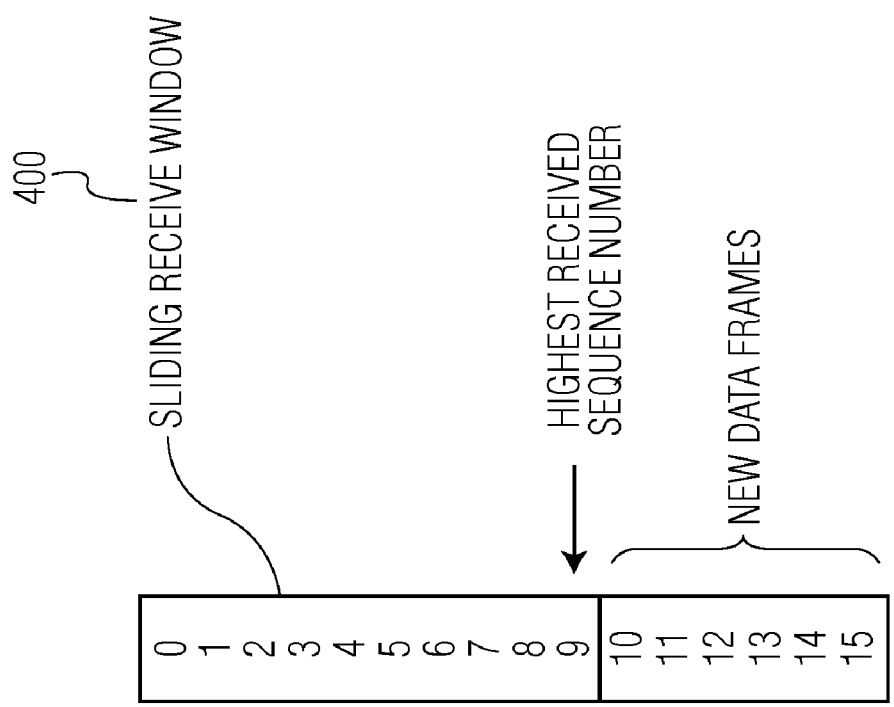
FIG. 4 depicts a sliding receive window relative to a series of data frames.

Only a transmitter that transmits a data frame is guaranteed to know whether the transmitted data frame is a retransmission, while only a receiver that receives a data frame is guaranteed to know whether the received data frame was previously received. In an embodiment, the sliding receive window information 312 includes information that indicates whether a received data frame is a retransmitted data frame. Using the retransmission information (i.e., information that indicates whether a received data frame is a retransmitted data frame), the sliding receive window protocol can improve protocol efficiency, as described below with reference to FIG. 4. As shown in FIG. 4, an exemplary sliding receive window 400 includes ten data frames of sixteen data frames that may be transmitted to the communications device 300. The frame sequence numbers used in the receiver 302, which are between "0" and "15," can be represented in four bits. The frame sequence numbers of the ten data frames in the sliding receive window are "0"-"9", where the frame sequence number of the most recently received data frame is "9." Data frames, whose frame sequence numbers are between "10" and "15," are not within the sliding receive window and have not been received by the receiver. At first, the communications device receives data frames "0"-"9" and updates the sliding receive window from [0-9] to [10-3]. Then, for some reason, data frame "0" is retransmitted to the communications device. If the sliding receive window information does not include the retransmission information, the communications device will mistakenly interpret the retransmitted data frame "0" as a new data frame and as a result, set the received data frames out of order. However, by including the retransmission information in the sliding receive window information, the communications device can correctly identify the retransmitted data frame "0" as a retransmitted data frame and keep the received data frames in correct order.

In the embodiment of FIG. 3, the receiver 302 includes a computer readable medium 314 and a receiver buffer 316. The computer readable medium is configured to store the sliding receive window information 312. The receiver buffer is configured to temporarily store at least one received data frame.

The frame retransmission identifying unit 304 is configured to use the sliding receive window information 312 to determine whether a data frame is a retransmitted data frame. If the data frame is determined to be a retransmitted data frame, the communications device 300 may ignore the data frame and transmit a response data frame to acknowledge the data frame using the transmitter 310. If the data frame is determined not to be a retransmitted data frame, the receiver 302 may buffer the data frame in the receiver buffer 316 and acknowledge the data frame using the transmitter. All of the data frames that are successfully received are acknowledged.

The frame determining unit 306 is configured to determine whether a received data frame is one of the data frames that the receiver 302 is currently accepting. In an embodiment, the sliding receive window information 312 contains information about data frames that the receiver is currently accepting and the frame determining unit uses the sliding receive window information to determine whether the data frame is one of the data frames in the sliding receive window. For example, the information about the data frames in the sliding receive window includes the frame sequence numbers of the data frames that are in the sliding receive window and the frame determining unit determines whether the frame sequence number of a received data frame is one of the frame sequence numbers of the data frames in the sliding receive window.

In an embodiment, the number of data frames in the sliding receive window is more than half of the total number of frame sequence numbers that are used in the receiver 302. For example, as shown in FIG. 4, the total frame sequence numbers that are used in the receiver is 16 and the number of data frames in the sliding receive window 400 is 10. Expanding the sliding receive window information 312 to accept more data frames can improve the throughput of the sliding receive window protocol. In a conventional sliding window protocol, the number of data frames in a sliding window is at most half of the total number of frame sequence numbers that are used. By including more than half of the total number of frame sequence numbers in the sliding receiver window, the sliding receive window protocol can accept more data frames than the conventional sliding window protocol.

The sliding receive window updating unit 308 is configured to update the sliding receive window information 312 stored in the computer readable medium 314 in response to received data frames. The sliding receive window updating updates the sliding receive window if the communications device 300 receives a new data frame, i.e., a data frame that the communications device has not received before. The new data frame may be a data frame that is in the sliding receive window or a data frame that is in outside the sliding receive window, i.e., it is not one of the data frames that are in the sliding receive window. In an embodiment, the sliding receive window is updated using received data frames so that the end of the sliding receive window points to the data frame that has the highest sequence number among the received data frames, whether or not the data frame is inside or outside the sliding receive window. Therefore, compared to a conventional sliding window protocol that ignores a received data frame that is outside the sliding window and does not update the sliding window in response to the received data frame, the sliding receive window protocol can improve protocol efficiency.

Figure 5:
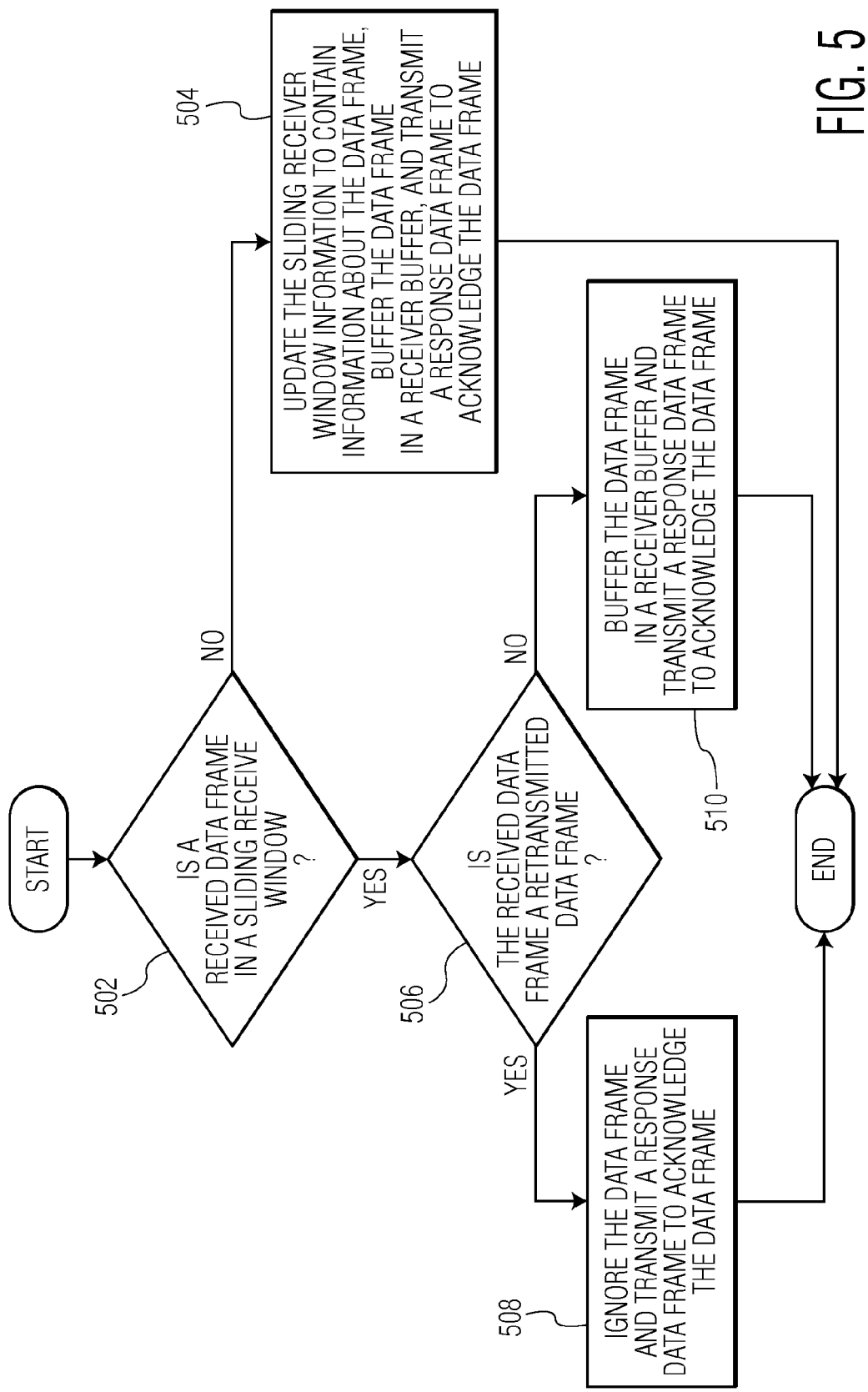
FIG. 5 illustrates an exemplary operation of the communications device depicted in FIG. 3.

FIG. 5 illustrates an exemplary operation of the communications device 300 depicted in FIG. 3. As illustrated in FIG. 5, the communications device receives a data frame and processes the data frame. In step 502, the frame determining unit 306 determines whether the data frame is one of the data frames in the sliding receive window. In step 504, if the data frame is determined not to be one of data frames in the sliding receive window, the sliding receive window updating unit 308 updates the sliding receive window information 312 to contain information about the data frame and the receiver 302 buffers the data frame in the receiver buffer 316 and transmits a response data frame to acknowledge the data frame. In step 506, if the data frame is determined to be one of data frames in the sliding receive window, the frame retransmission identifying unit 304 determines whether the data frame is a retransmitted data frame using the sliding receive window information. In step 508, if the data frame is determined to be a retransmitted data frame, the receiver ignores the data frame and transmits a response data frame to acknowledge the data frame. In step 510, if the data frame is determined not to be a retransmitted data frame, the receiver buffers the data frame in the receiver buffer and transmits a response data frame to acknowledge the data frame.

Another exemplary operation of the communications device 300 of FIG. 3 is described as follows. A data frame is received in the receiver 302 of the communications device. The sequence number of the data frame is checked with frame sequence numbers of the data frames in the sliding receive window. If the sequence number of the data frame is within the range of frame sequence numbers of the data frames in the sliding receive window, the frame sequence number of the data frame will be checked using the sliding receive window information 312 to determine whether the data frame has previously been received. A data frame that has been previously received will be acknowledged and data from a data frame that has been previously received will be ignored. Data from a data frame which has not been received is added to the receiver buffer 316. If the sequence number of the data frame is outside the range of frame sequence numbers in the sliding receive window, then the sliding receive window will be updated to shift the end of the sliding receive window to point to the newly received frame sequence number and data from the data frame will be added to the receiver buffer and acknowledged. All of the data frames that are successfully received are acknowledged.

In an embodiment, data frames that are received by the communications device depicted in FIG. 3 are transmitted using a sliding transmit window protocol, which is described below with respect to FIGS. 6-8.

Figure 6:
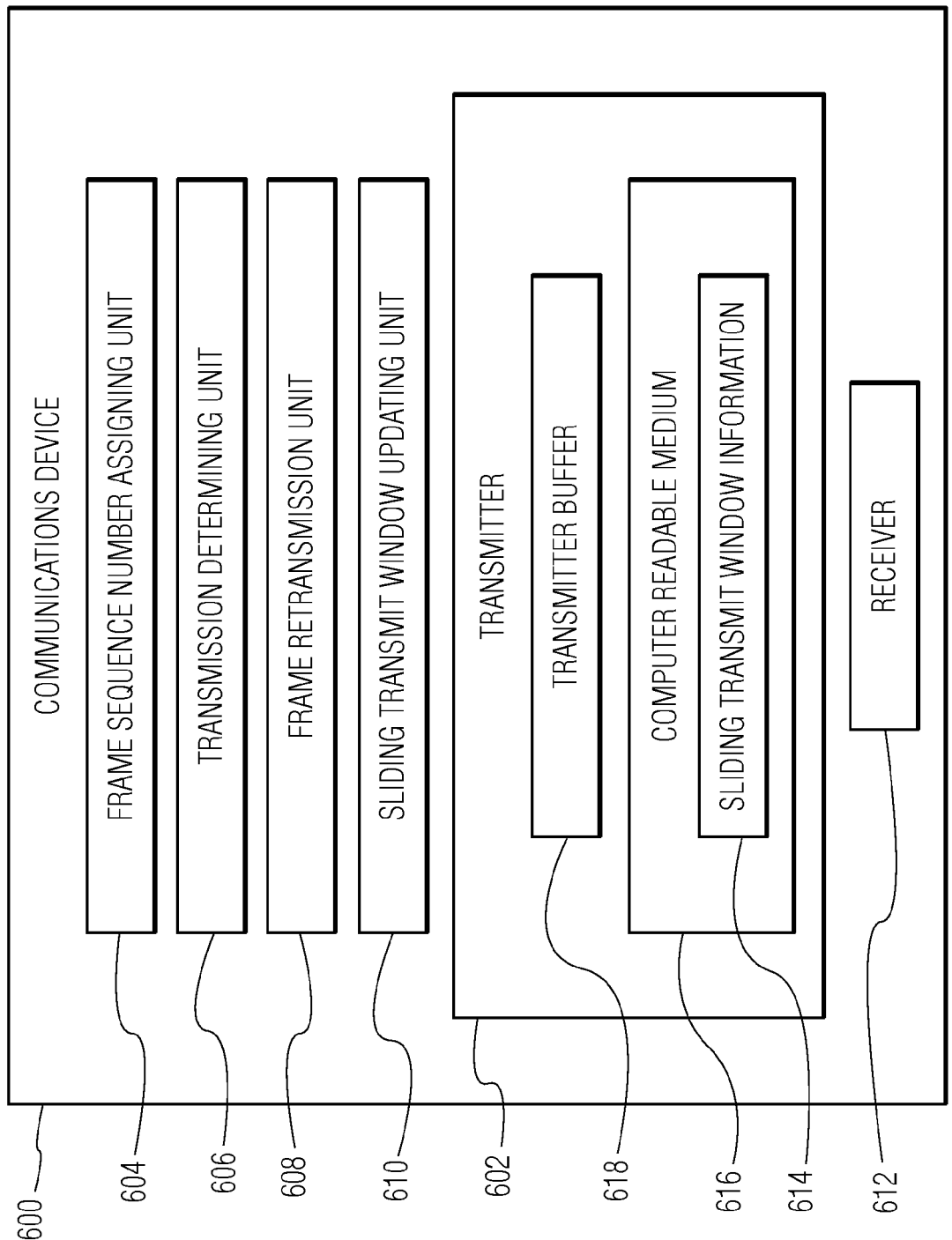
FIG. 6 is a schematic block diagram of another communications device in accordance with an embodiment of the invention.
Figure 7:
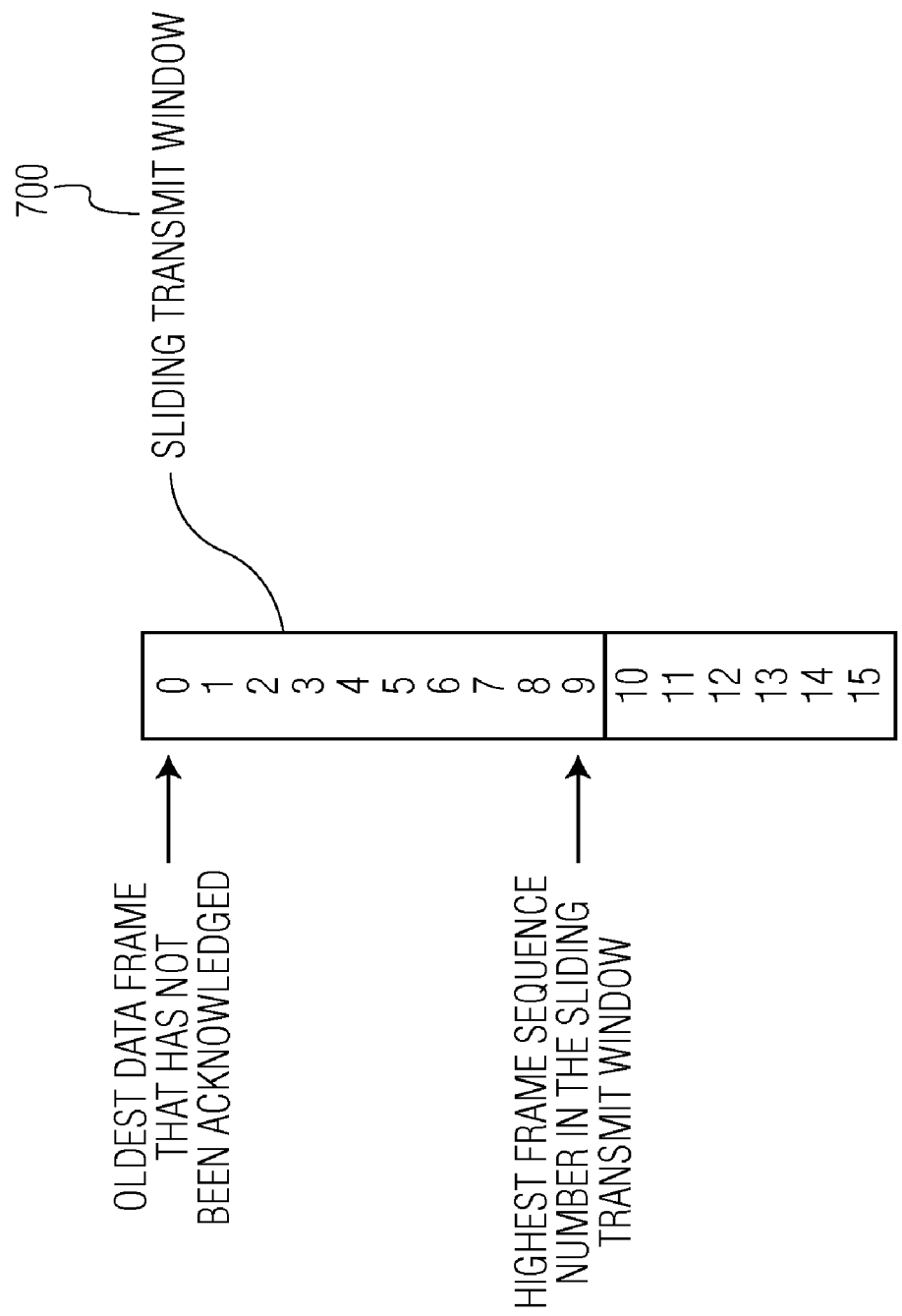
FIG. 7 depicts a sliding transmit window relative to a series of data frames.

FIG. 6 is a schematic block diagram of another communications device 600 in accordance with an embodiment of the invention. As shown in FIG. 6, the communications device includes a transmitter 602, a frame sequence number assigning unit 604, a transmission determining unit 606, a frame retransmission unit 608, a sliding transmit window updating unit 610, and a receiver 612. The communications device transmits data frames using a sliding transmit window protocol, where a sliding transmit window of the sliding transmit window protocol is identified by sliding transmit window information 614. Although the transmitter is shown as being separate from the frame sequence number assigning unit, the transmission determining unit, the frame retransmission unit, and the sliding transmit window updating unit in FIG. 6, the transmitter may be integrated with the frame sequence number assigning unit, the transmission determining unit, the frame retransmission unit, and the sliding transmit window updating unit in other embodiments.

In the embodiment of FIG. 6, the transmitter 602 includes a computer readable medium 616 and a transmitter buffer 618. The computer readable medium is configured to store the sliding transmit window information 614. The sliding transmit window information contains information about data frames that are currently allowed to be transmitted using the transmitter without waiting for an acknowledgement signal, which is received using the receiver 612. The transmitter buffer is configured to temporarily store at least one data frame that is to be transmitted by the transmitter.

In an embodiment, the number of data frames that are currently allowed to be transmitted by the transmitter 602 is more than half of the total number of frame sequence numbers that are used in the transmitter, as described below with reference to FIG. 7. As shown in FIG. 7, an exemplary the sliding transmit window 700 includes ten data frames of sixteen data frames that may be transmitted from the transmitter. The total frame sequence numbers used in the transmitter, which are between "0" and "15," is sixteen and can be represented in four bits. The frame sequence numbers of the ten data frames in the sliding transmit window are "0"-"9." The oldest data frame that has not been acknowledged has a frame sequence number "0." Data frames, whose frame sequence numbers are between "10" and "15," are not within the sliding transmit window and are not currently allowed to be transmitted. In conventional sliding window protocols, the number of data frames in a sliding window is at most half of the total number of frame sequence numbers that are used, which may lead to transmission idling while the transmitter waits to receive acknowledgements for all of the previously transmitted frames in the sliding window. In contrast to the convention sliding window protocols, including more than half of the total number of frame sequence numbers in the sliding transmit window can reduce the occurrence of transmission idling. Therefore, compared to the conventional sliding window protocols, the sliding transmit window protocol described herein decreases the potential for transmission idling and conserves bandwidth resources.

The frame sequence number assigning unit 604 is configured to assign a respective frame sequence number to each of the data frames to be transmitted by the transmitter 602. In an embodiment, the frame sequence number assigning unit assigns frame sequence numbers to the data frames in the order that the data frames arrive at the transmitter and the transmitter transmits the data frames in the order of their frame sequence numbers.

The transmission determining unit 606 is configured to determine whether or not to transmit a set of data frames using the sliding transmit window protocol. In an embodiment, the sliding transmit window of the sliding transmit window protocol is identified by sliding transmit window information 614 that includes information about data frames that are currently allowed to be transmitted from the transmitter 602 without waiting for an acknowledgement signal. For example, the sliding transmit window information contains the frame sequence numbers of the data frames that are in the sliding transmit window and the transmission determining unit determines whether the frame sequence numbers of the set of data frames is in the range of frame sequence numbers in the sliding transmit window. In an embodiment, the number of data frames in the set is smaller than the number of the data frames in the sliding transmit window. For example, in a sliding transmit window of 10 data frames, 5 data frames may be transmitted as a set.

The frame retransmission unit 608 is configured to determine whether or not to retransmit at least one of the data frames in the set. For example, the frame retransmission unit determines whether or not to retransmit the data frame in response to a negative acknowledgement signal. The negative acknowledgement signal may be generated by a receiving device (not shown). For example, the negative acknowledgement signal is an acknowledgement bit in a response data frame that is explicitly set as negative by a receiving device. A negative acknowledgement signal may also be generated by the frame retransmission unit itself when a data frame or a corresponding response data frame that carries a positive acknowledgement signal is lost or corrupted. In this case, the negative acknowledgement signal may be an alarm signal that is generated by the frame retransmission unit after the expiration of a waiting period.

In an embodiment, the frame retransmission unit 608 determines whether or not to retransmit at least one of the data frames in the set before all of the data frames in the sliding transmit window have been transmitted a first time. If a data frame in the set needs to be retransmitted, the transmitter 602 may retransmit the data frame before all of the data frames in the sliding transmit window have been transmitted a first time. Because the frame retransmission unit can determine whether a data frame need to be retransmitted before all of the data frames in the sliding transmit window have been transmitted a first time and because a data frame can be retransmitted before all of the data frames in the sliding transmit window have been transmitted a first time, the sliding transmit window and the corresponding sliding receive window can be updated without waiting until all of the data frames in the sliding transmit window are transmitted. As opposed to conventional sliding window protocols that do not evaluate negative acknowledgements until the end of the sliding window, the sliding transmit window protocol has the advantage of more frequent sliding transmit window updating, which can improve the communications throughput of the communications device 600. For example, in conventional sliding window protocols that do not evaluate negative acknowledgements until the end of the sliding window, transmission idling may occur as a result of waiting to update the sliding window until after all of the data frames in the sliding window have been transmitted a first time. If transmission idling occurs, a communications device stops its data transmission and waits for acknowledgements of previously transmitted data and, as a result, communications bandwidth can be wasted. By evaluating negative acknowledgements before the end of the sliding transmit window, the sliding transmit window protocol that is used by the communications device depicted in FIG. 6 can reduce the occurrence of transmission idling. Therefore, compared to conventional sliding window protocols, the sliding transmit window protocol that is used by the communications device depicted in FIG. 6 can decrease the potential bandwidth waste and conserve bandwidth resources.

The sliding transmit window updating unit 610 is configured to update the sliding transmit window information 614 stored in the computer readable medium 616. For example, the sliding transmit window updating unit updates the sliding transmit window information in response to an acknowledgement signal of at least one previously transmitted data frame so that the start of the sliding transmit window points to the oldest data frame that has not been acknowledged.

Figure 8:
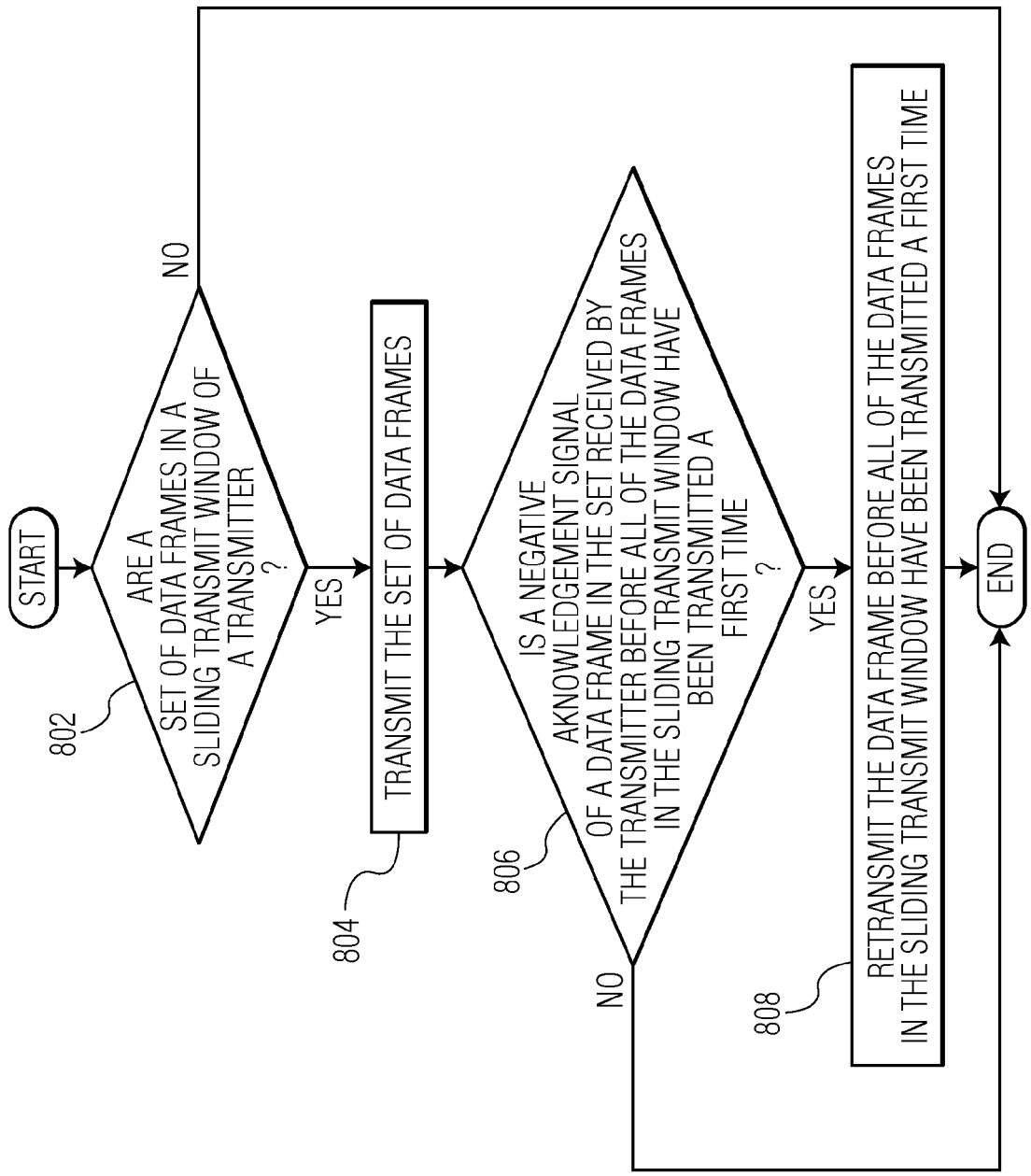
FIG. 8 illustrates an exemplary operation of the communications device depicted in FIG. 6.

FIG. 8 illustrates an exemplary operation of the communications device 600 depicted in FIG. 6. As illustrated in FIG. 8, the communications device transmits a set of data frames and handles the possible retransmission of one or more data frames in the set. In step 802, the transmission determining unit 606 determines whether the set of data frames in the transmitter 602 are data frames in the sliding transmit window. In step 804, if the set of data frames is determined to be in the sliding transmit window, the transmitter transmits the set of data frames. In step 806, the frame retransmission unit 608 determines whether a negative acknowledgement signal of a data frame in the set is received by the transmitter before all of the data frames in the sliding transmit window have been transmitted a first time. In step 808, if the negative acknowledgement signal of the data frame in the set is received, the transmitter retransmits the data frame before all of the data frames in the sliding transmit window have been transmitted a first time.

Another exemplary operation of the communications device 600 of FIG. 6 is described as follows. Data frames that arrive at the transmitter 602 are assigned frame sequence numbers in the order that the data frames arrive at the transmitter. The data frames that are assigned frame sequence numbers are temporarily stored in the transmitter buffer 618. For a data frame stored in the transmitter buffer, the frame sequence number of the data frame is checked with the frame sequence numbers of the data frames in the sliding transmit window. If the sequence number of the data frame is within the range of frame sequence numbers in the sliding transmit window, the transmitter transmits the data frame. If a negative acknowledgement signal of the data frame is received by the transmitter, the transmitter retransmits the data frame before all of the data frames in the sliding transmit window have been transmitted a first time. New data frames that have not been transmitted and old data frames that have been transmitted and need to be retransmitted are separately scheduled for transmission in the transmitter. The old data frames are scheduled for transmission in the transmitter according to an order, for example, the order that the data frames arrive at the transmitter. The scheduled new and old data frames are transmitted in bursts before all of the data frames in the sliding transmit window have been transmitted by the transmitter.

Data frames that are received by a communications device using a sliding receive window protocol in a data communications system may be transmitted from another communications device that uses a sliding transmit window protocol. In other words, a data communications system may use a sliding window protocol that addresses both transmission and reception of data frames. An exemplary sliding window protocol is described below with respect to FIGS. 9-15B.

FIG. 9 is a schematic block diagram of a system 900 for data communications in accordance with another embodiment of the invention. As shown in FIG. 9, the system includes a first communications device 600 and a second communications device 300 as described with reference to FIGS. 6 and 3, respectively. The system uses a sliding window protocol for communications between the first and second communications devices. In some conventional sliding window protocols, a handshake phase is implemented during which a receiver sends its sliding window to a transmitter to synchronize the sliding windows and data transfer starts only after a successful handshake phase. However, in the embodiment of FIG. 9, an explicit handshake phase is not required to synchronize transmit and receive sliding windows. Instead, a connection reset mechanism can be implemented. A data frame that carries valid data may also contain a connection reset signal, which instructs the second communications device to unconditionally accept a data frame with a data frame sequence number "0," to discard any previously transmitted data frames that might still be waiting in the receiver buffer, and to reset the sliding receive window. Because an explicit handshake phase is not required and the valid data frame carries valid data, more time and more transmission bandwidth are provided for actual data transfer.

Figure 10:
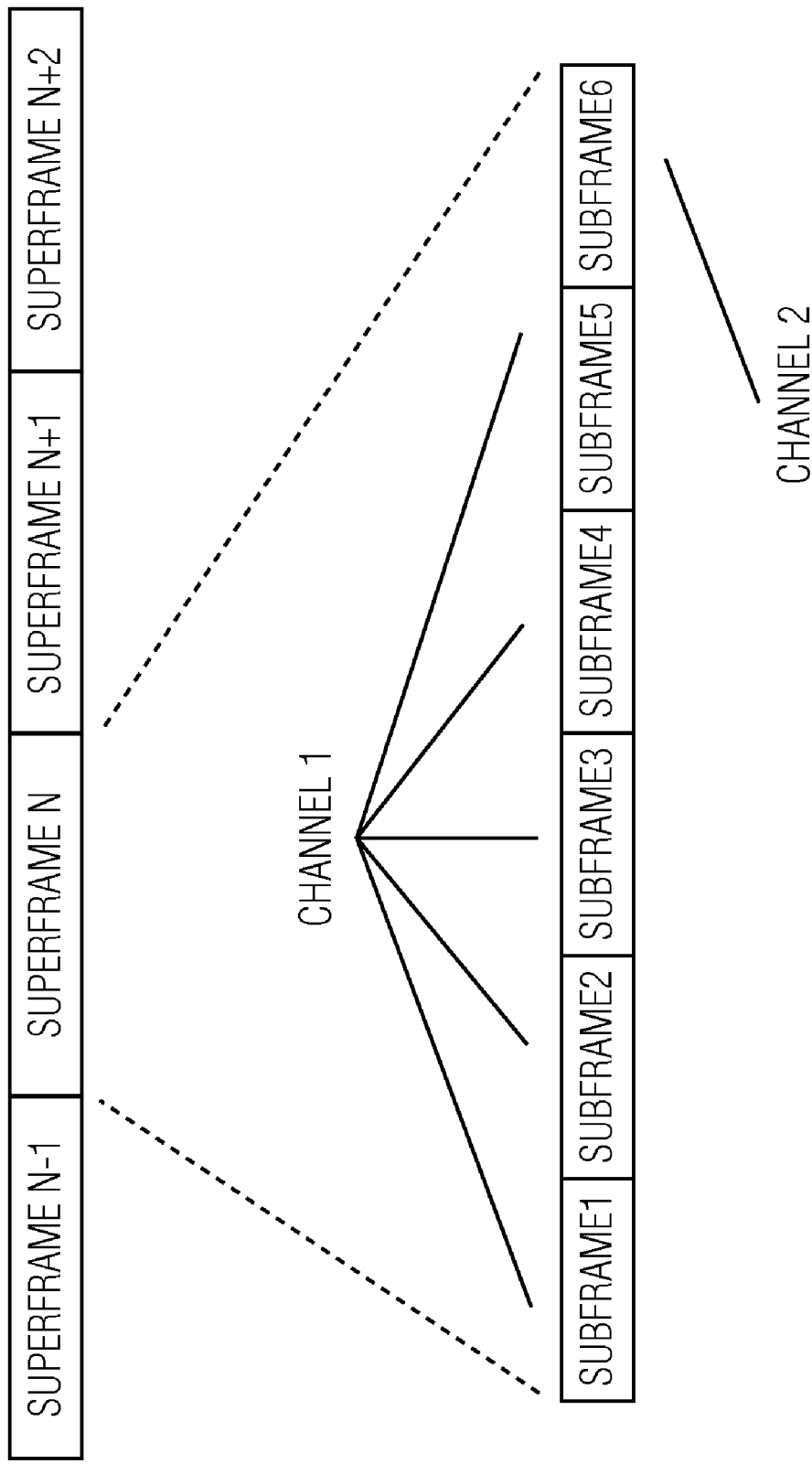
FIG. 10 depicts an exemplary Time Division Multiplexing Access (TDMA) scheme that can be used by the system of FIG. 9 and exemplary logic channels for the TDMA scheme.

FIG. 10 depicts an exemplary TDMA scheme that can be used by the system 900 of FIG. 9 and exemplary logic channels for the TDMA scheme. The first communications device transmits in streaming channels (SCHs) 1-5 and receives in SCH 6. The second communications device receives in SCHs 1-5 and transmits in SCH 6. In the TDMA scheme, a superframe is the principal time division for the TDMA schedule. The superframe includes six TDMA slots called subframes. Depending on the location in the superframe, a subframe is transmitted using one of SCHs 1-6. Two logical channels, channel 1 and channel 2, are constructed from the subframes transmitted using the SCHs 1-6. The channel 1 uses SCHs 1-5 and the channel 2 uses SCH 6. The connection-oriented logical channels support high bandwidth control data. In an embodiment, the channel 1 is used for transmission from the first communications device 600 to the second communications device 300 and the channel 2 is used for transmission from the second communications device to the first communications device. For example, SCHs 1-5 are used to transmit five data frames from the first communications device to the second communications device and the SCH 6 is used to transmit an acknowledgement signal for the five data frames from the second communications device to the first communications device.

Figure 11:
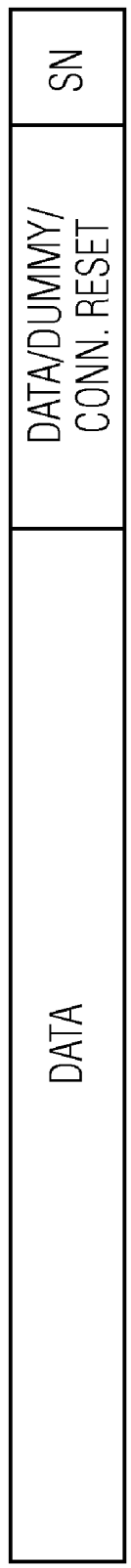
FIGS. 11 and 12 depict exemplary data frames that can be transmitted in the system of FIG. 9.

FIG. 11 depicts an exemplary data frame transmitted from the first communications device 600 to the second communications device 300. A data frame transmitted from the first communications device to the second communications device is also referred to as a forward frame. As shown in FIG. 11, a forward data frame contains data bits and tail bits. The tail bits include a 4-bit sequence number "SN," which is between a range of "0"-"15" and has the same lifecycle as the communications connection between the first communications device 600 and the second communications device 300.

Figure 12:
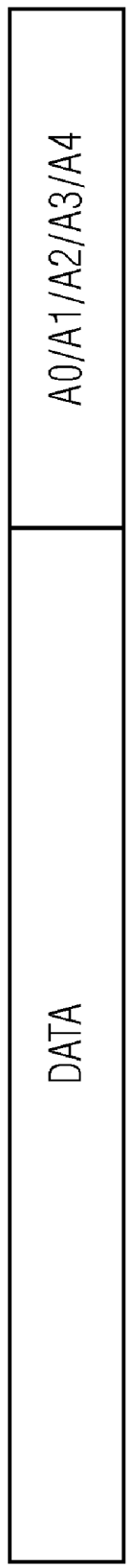

FIG. 12 depicts an exemplary data frame transmitted from the second communications device 300 to the first communications device 600. A data frame transmitted from the second communications device to the first communications device is also referred to as a reverse frame. As shown in FIG. 12, a reverse data frame contains data bits and tail bits. The tail bits include 5 acknowledgement bits "A0"-"A4" for forward data frames.

Figure 13:
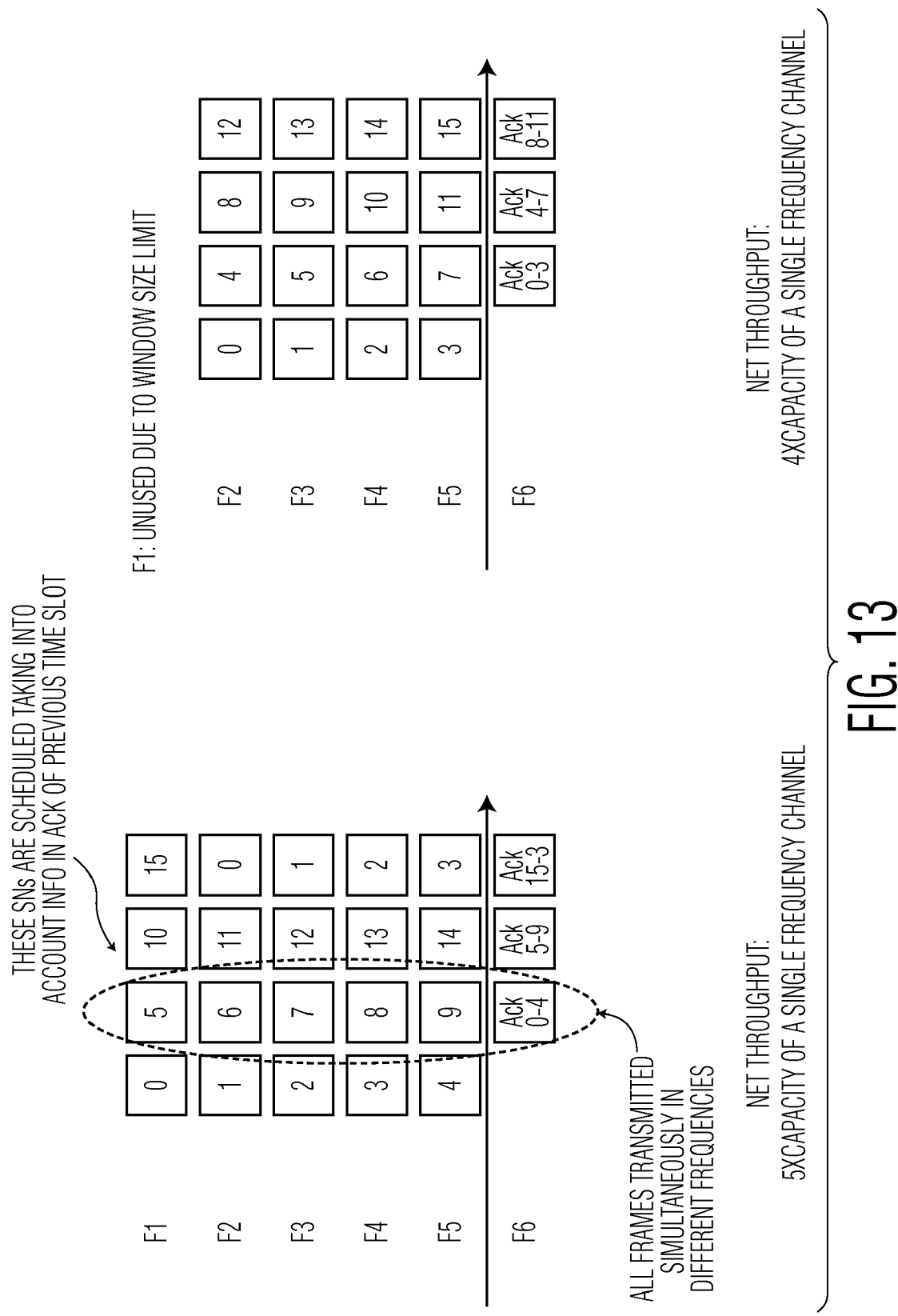
FIG. 13 depicts exemplary operations of the system of FIG. 9 under a frequency multiplexing scheme.

FIG. 13 depicts exemplary operations of the system 900 of FIG. 9 under a frequency multiplexing scheme. As shown in FIG. 13, five frequency channels "F1"-"F5" are used to simultaneously transmit multiple forward data frames from the first communications device 600 to the second communications device 300. Also shown in FIG. 13, one frequency channel "F6" is used to transmit a reverse data frames from the second communications device 600 to the second communications device 300 to acknowledge the forward data frames that are successfully transmitted.

By increasing the size of the sliding transmit window and the corresponding sliding receive window, the network throughput of the system 900 of FIG. 9 can be increased. Assuming the total frame sequence numbers used in the first communications device 600 and the second communications device 300 are both 16 and between "0" and "15." On the left side of FIG. 13, the size of the sliding transmit window and the size of the sliding receive window are both ten data frames, while on the eight side of FIG. 13, the size of the sliding transmit window and the sliding receive window are both eight data frames. On the left side of FIG. 13, five data frames are transmitted in five frequency channels in a time slot and acknowledged in the next time slot. As a result, on the left side of FIG. 13, the network throughput of the system is five times of the capacity of a single frequency channel. On the right side of FIG. 13, four data frames are transmitted in four frequency channels in a time slot and acknowledged in the next time slot. As a result, on the right side of FIG. 13, the network throughput of the system is only four times of the capacity of a single frequency channel. Therefore, by increasing the size of the sliding transmit window and the corresponding sliding receive window from eight data frames to ten data frames, the network throughput of the system increases from four times of the capacity of a single frequency channel to five times of the capacity of a single frequency channel.

FIGS. 14A, 14B, 14C, and 14D illustrate exemplary operations of the first communications device 600 of FIG. 9. In the exemplary operations, the first communications device transmits forward data frames using five subframes of each superframe. Frame sequence numbers are attached to each forward data frame to indicate the intended data frame ordering and to identify the forward data frames. The first communications device receives a response data frame that contains five acknowledgment bits to acknowledge the five forward data frames. All forward data frames are acknowledged. If a reverse data frame is lost or corrupted, the corresponding forward data frames are not acknowledged and will be retransmitted. Four bit sequence numbers are used and sixteen frame sequence numbers are used, which are in a range between 0 and 15. The size of the transmit window is fixed to 10 and the start of the transmit window indicates the frame sequence number of the oldest unacknowledged data frame.

Figure 14A:
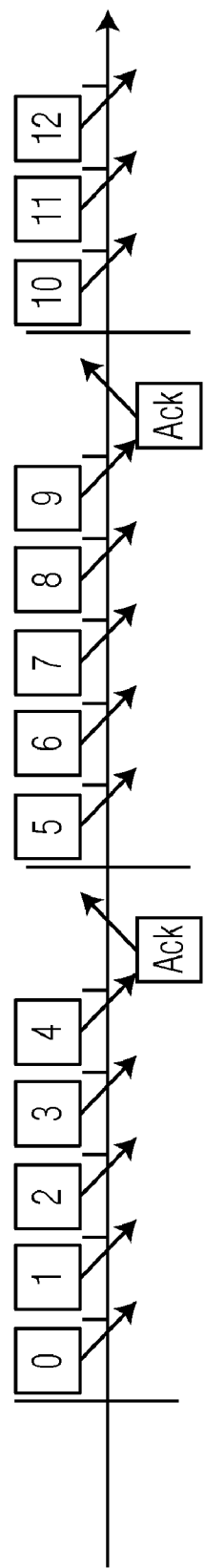
Figure 14B:
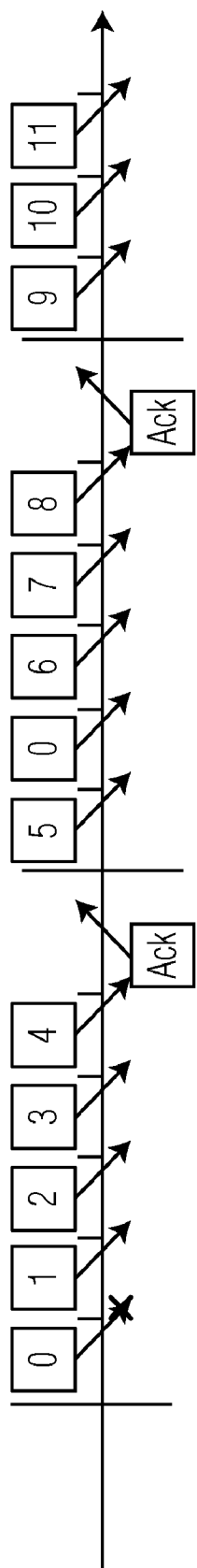

The first communications device 600 schedules frames in an order in which the sequence number increases for each new frame. Under good circumstances, all transmitted frames are acknowledged and no retries are needed. If no frames are available for transmission, dummy frames are transmitted until new frames become available in the first communications device. As shown in FIG. 14A, data frames "0"-"4" are transmitted by the first communications device and a reverse data frame that acknowledges data frames "0"-"4" is received by the first communications device. Then, data frames "5"-"9" are transmitted by the first communications device and a reverse data frame that acknowledges data frames "5"-"9" is received by the first communications device.

If an acknowledgement signal indicates lost or corrupted data frames, the data frames are retransmitted on the next occasion. After processing an acknowledgement signal, the first communications device 600 schedules the next five frames until the next acknowledgement signal is processed. The first communications device schedules possible data frame retransmissions first and then schedules new frames in an order in which frame sequence numbers are increasing. If the five available slots cannot be filled with retransmission frames and/or new frames, the remaining slots are filled with additional retries of the oldest frame to be retried. If no new data frames or no data frames with a pending retransmission are left, dummy frames are transmitted.

Figure 14C:
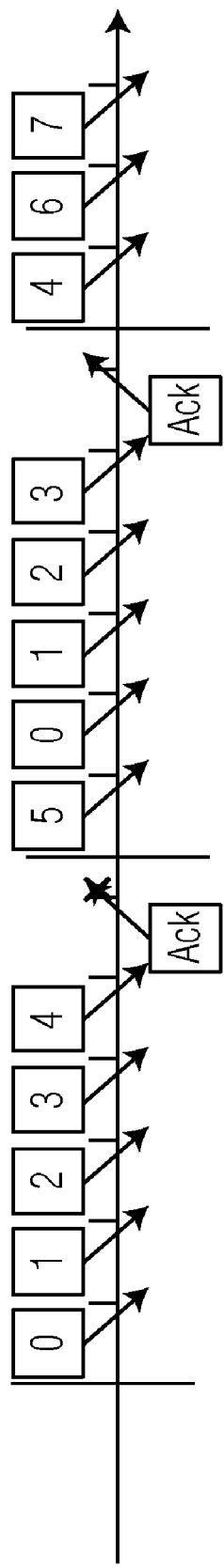

If an acknowledgement frame is lost, no forward data frames are acknowledged and all of the forward data frames are retransmitted in the order that the forward data frames were previously transmitted. As shown in FIG. 14C, data frames "0"-"4" are transmitted by the first communications device 600 and a reverse data frame that acknowledges data frames "0"-"4" is lost or corrupted. Then, a new data frame "5" and old data frames "0"-"3" are transmitted by the first communications device and a reverse data frame that acknowledges data frames "5" and "0"-"3 is received by the first communications device. Then, old data frame "4" and new data frames "6" and "7" are transmitted by the first communications device.

Figure 14D:
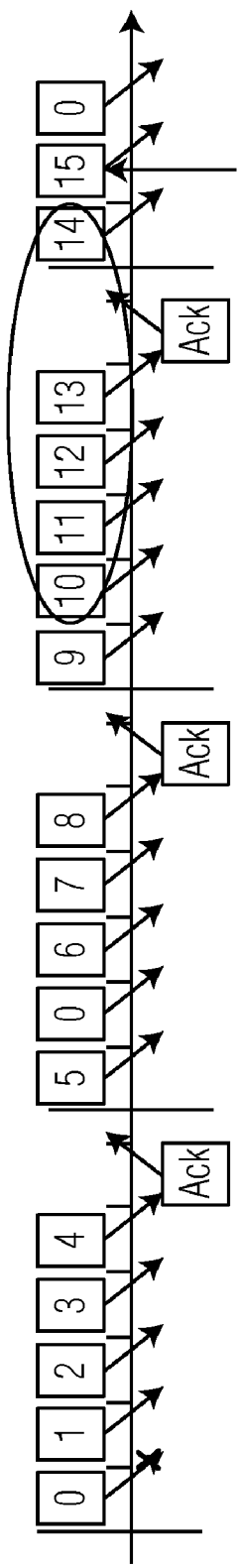

The first communications device 600 shifts the sliding transmit window if an acknowledgement signal is received. As shown in FIG. 14D, data frames "0"-"4" are transmitted by the first communications device and an acknowledgement signal that indicates data frame "0" need to be retransmitted is received by the first communications device. Then, new data frames "5" and "6"-"8" and data frame "0" is transmitted and a reverse data frame that acknowledges data frames "5," "0", and "6"-"8" is received by the first communications device. Then, the sliding transmit window is updated by the first communications device and data frames "9"-"15" and a new data frame "0" that is in the next frame sequence are transmitted.

FIGS. 15A and 15B illustrate exemplary operations of the system 900 of FIG. 9. In the exemplary operations, 4 bit sequence numbers are used and 16 frame sequence numbers are used, which are in a range between 0 and 15. The sizes of the sliding receive window in the second communications device 300 and the sliding transmit window in the first communications device 600 are identical and fixed to 10. The sliding transmit window is initialized to [0, 9] and the sliding receive window is initialized to [6, 15]. In the exemplary operations, the sliding receive window sticks to or lags behind the sliding transmit window and takes into account missing acknowledgements from the second communications device to the first communications device.

As shown in FIG. 15A, the first communications device 600 transmits data frames "0"-"4" to the second communications device 300. The second communications device receives data frames "0"-"4," updates the sliding receive window to [11, 4], and transmits a reverse data frame that acknowledges data frames "0"-"4" to the first communications device. The first communications device receives the reverse frame, updates the sliding transmit window to [5, 14], and transmits data frames "5"-"9" to the second communications device. The second communications device receives data frames "5"-"9," updates the sliding receive window to [0, 9], and transmits a reverse data frame that acknowledges data frames "5"-"9" to the first communications device. The first communications device receives the reverse frame, updates the sliding transmit window to [10, 3], and transmits data frames "10"-"14" to the second communications device. The second communications device notices that data frames "10"-"14" are corrupted and transmits a reverse data frame that includes five negative acknowledgement bits for data frames "10"-"14" to the first communications device. The first communications device receives the reverse frame and transmits new data frame "15" and some of old data frames "10"-"14" (not shown) to the second communications device.

As shown in FIG. 15B, the first communications device 600 transmits data frames "0"-"4" to the second communications device 300. The second communications device receives data frames "0"-"4," updates the sliding receive window to [11, 4], notice that data frame "0" is corrupted, and transmits a reverse data frame that acknowledges data frames "1"-"4" to the first communications device. The first communications device receives the reverse frame and transmits new data frames "5"-"8" and old data frame "0" to the second communications device. The second communications device receives data frames "0" and "5"-"8" and updates the sliding receive window to [15, 8], and transmits a reverse data frame that acknowledges data frames "0" and "5"-"8" to the first communications device. The first communications device receives the reverse frame, updates the sliding transmit window to [9, 2], and transmits data frames "9"-"13" to the second communications device. The second communications device receives data frames "9"-"13," updates the sliding receive window to [4, 13], and transmits a reverse data frame that acknowledges data frames "9"-"13" to the first communications device. The first communications device receives the reverse frame, updates the sliding transmit window to [14, 7] and transmits data frame "14" to the second communications device. The second communications device receives data frame "14" and updates the sliding receive window to [5, 14].

FIG. 16 is a process flow diagram of a method for data communications in accordance with an embodiment of the invention. At block 1602, a data frame is received in a receiver using a sliding receive window protocol, where a sliding receive window of the sliding receive window protocol is identified by sliding receive window information. At block 1604, whether the data frame is a retransmitted data frame is determined using the sliding receive window information.

It should be noted that at least some of the operations for the methods described herein may be implemented using software instructions stored on a computer useable storage medium for execution by a computer. As an example, an embodiment of a computer program product includes a computer useable storage medium to store a computer readable program that, when executed on a computer, causes the computer to perform operations, as described herein. It should also be noted that at least some of the operations for the methods described herein may be implemented using hardware.

Additionally, embodiments of at least portions of the invention can take the form of a computer program product accessible from a computer usable or computer readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer useable or computer readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Furthermore, the various components or units of the embodiments that have been described or depicted may be implemented in a processor, which includes a multifunction processor and/or an application-specific processor. Examples of processors include the PowerPC™ family of processors by IBM and the x86 family of processors by Intel.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for data communications, the method comprising:
   receiving a data frame in a receiver using a sliding receive window protocol, wherein a sliding receive window of the sliding receive window protocol is identified by sliding receive window information; and
   determining whether the data frame is a retransmitted data frame using the sliding receive window information,
   wherein the method further comprises:
   if the data frame is determined to be the retransmitted data frame,
   ignoring the data frame; and
   transmitting a response data frame to acknowledge the data frame,
   wherein the method further comprises:
   if the data frame is determined not to be the retransmitted data frame,
   buffering the data frame in a receiver buffer; and
   transmitting a response data frame to acknowledge the data frame,
   wherein the sliding receive window information comprises information about data frames in the sliding receive window that the receiver is currently accepting, wherein the information about the data frames in the sliding receive window comprises frame sequence numbers of the data frames in the sliding receive window, and the method further comprising determining whether the data frame is one of the data frames in the sliding receive window.

2. The method of claim 1, further comprising:
   if the data frame is determined not to be one of the data frames in the sliding receive window,
   updating the sliding receive window information to contain the frame sequence number of the data frame;
   buffering the data frame in the receiver buffer; and
   transmitting a response data frame to acknowledge the data frame.

3. The method of claim 1, wherein the number of data frames in the sliding receive window is more than half of frame sequence numbers that are used in the receiver.

4. The method of claim 1, wherein receiving the data frame comprises receiving a burst of data frames in the receiver using the sliding receive window protocol, and wherein determining whether the data frame is the retransmitted data frame comprises determining whether each data frame of the burst of data frames is a retransmitted data frame using the sliding receive window information, respectively.

5. The method of claim 4 further comprising receiving the burst of data frames in different frequency channels.

6. A method for data communications, the method comprising:
   transmitting a set of data frames from a transmitter using a sliding transmit window protocol, wherein a sliding transmit window of the sliding transmit window protocol is identified by sliding transmit window information about data frames that are currently allowed to be transmitted from the transmitter without waiting for an acknowledgement signal, wherein the number of data frames in the set is smaller than the number of the data frames in the sliding transmit window;
   determining whether or not to retransmit one of the data frames in the set before all of the data frames in the sliding transmit window have been transmitted by the transmitter;
   receiving a data frame in a receiver using a sliding receive window protocol, wherein a sliding receive window of the sliding receive window protocol is identified by sliding receive window information; and determining whether the data frame is a retransmitted data frame using the sliding receive window information;

the method further comprising if the data frame is determined to be the retransmitted data frame, ignoring the data frame; and transmitting a response data frame to acknowledge the data frame;

the method further comprising if the data frame is determined not to be the retransmitted data frame, buffering the data frame in a receiver buffer; and transmitting a response data frame to acknowledge the data frame, wherein the sliding receive window information comprises information about data frames in the sliding receive window that the receiver is currently accepting, wherein the information about the data frames in the sliding receive window comprises frame sequence numbers of the data frames in the sliding receive window, and the method further comprising determining whether the data frame is one of the data frames in the sliding receive window.

7. The method of claim 6 further comprising:

if the one of the data frames in the set is determined to be retransmitted, transmitting the one of the data frames in the set before all of the data frames in the sliding transmit window have been transmitted by the transmitter.

8. The method of claim 7, wherein determining whether or not to retransmit the one of the data frames in the set comprises determining that a negative acknowledgement signal of the one of the data frames in the set is received by the transmitter.

9. The method of claim 7 further comprising:

assigning each of the data frames a respective frame sequence number in an order that the data frames arrive at the transmitter; and transmitting the data frames.

10. The method of claim 7, wherein transmitting the set of data frames comprises transmitting the set of data frames using a Time Division Multiplexing Access (TDMA) scheme.

11. The method of claim 7, wherein transmitting the set of data frames comprising transmitting the set of data frames in different frequency channels.

12. A communications device, the communications device comprising:

a receiver configured to receive a data frame using a sliding receive window protocol, wherein a sliding receive window of the sliding receive window protocol is identified by sliding receive window information; and a frame retransmission identifying unit configured to determine whether the data frame is a retransmitted data frame using the sliding receive window information, wherein the receiver ignores the data frame and transmits a response data frame to acknowledge the data frame if the data frame is determined to be the retransmitted data frame, wherein the communications device further comprises a receiver buffer configured to buffer the data frame if the data frame is determined not to be the retransmitted data frame, wherein the sliding receive window information comprises information about data frames in the sliding receive window that the receiver is currently accepting, wherein the information about the data frames in the sliding receive window comprises frame sequence numbers of the data frames in the sliding receive window, and wherein the number of data frames in the data frames in the sliding receive window is more than half of frame sequence numbers that are used in the receiver.

13. The communications device of claim 12 further comprising a frame determining unit configured to determine whether the data frame is one of the data frames in the sliding receive window.

14. The communications device of claim 13 further comprising a sliding receive window updating unit configured to update the sliding receive window information to contain information about the data frame if the data frame is determined not to be one of the data frames in the sliding receive window.

* * * * *